US012211526B2

(12) United States Patent
Garfunkel et al.

(10) Patent No.: US 12,211,526 B2
(45) Date of Patent: Jan. 28, 2025

(54) ADAPTIVE BIAS CONTROL FOR MAGNETIC RECORDING HEAD

(71) Applicant: Headway Technologies, Inc., Milpitas, CA (US)

(72) Inventors: Glen Garfunkel, San Jose, CA (US); Yan Wu, Cupertino, CA (US); Wenyu Chen, San Jose, CA (US); Kunliang Zhang, Fremont, CA (US); Min Li, Fremont, CA (US); Shohei Kawasaki, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/497,867

(22) Filed: Oct. 30, 2023

(65) Prior Publication Data

US 2024/0071414 A1  Feb. 29, 2024

Related U.S. Application Data

(62) Division of application No. 17/856,585, filed on Jul. 1, 2022, now Pat. No. 11,887,635, which is a division
(Continued)

(51) Int. Cl.
*G11B 5/39* (2006.01)
*G11B 5/00* (2006.01)
*G11B 5/48* (2006.01)

(52) U.S. Cl.
CPC .......... *G11B 5/3932* (2013.01); *G11B 5/3909* (2013.01); *G11B 5/3912* (2013.01);
(Continued)

(58) Field of Classification Search
None
See application file for complete search history.

(56) References Cited

U.S. PATENT DOCUMENTS 6,005,753 A   12/1999  Fontana, Jr. et al.
6,911,710 B2   6/2005  Nickel et al.
(Continued)

OTHER PUBLICATIONS

"An Areal-Density Capability Study of SMR by using improved Write and Read Heads," by T. Kagami et al., Intermag 2011. IEICE Technical, Committee Submission System, Conference Paper's Information, 3 pgs., Nov. 18, 2011.
(Continued)

*Primary Examiner* — Craig A. Renner
(74) *Attorney, Agent, or Firm* — Salle Ackerman LLC; Stephen B. Ackerman

(57) ABSTRACT

A read head includes a permanent magnet (PM) layer formed up to 100 nm behind a free layer where PM layer magnetization may be initialized in a direction that adjusts free layer (FL) bias point, and shifts sensor asymmetry (Asym) closer to 0% for individual heads at slider or Head Gimbal Assembly level to provide a significant improvement in device yield. Asym is adjusted using different initialization schemes and initialization directions. With individual heads, initialization direction is selected based on a prior measurement of asymmetry. The PM layer is CoPt or CoCrPt and has coercivity from 500 Oersted to 1000 Oersted. The PM layer may have a width equal to the FL, or in another embodiment, the PM layer adjoins a backside of the top shield and has a width equal to or greater than that of the FL.

8 Claims, 7 Drawing Sheets

Related U.S. Application Data of application No. 17/081,235, filed on Oct. 27, 2020, now Pat. No. 11,380,355.

(52) U.S. Cl.
CPC .............. *G11B 2005/0008* (2013.01); *G11B 2005/0018* (2013.01); *G11B 5/3967* (2013.01); *G11B 5/4826* (2013.01); *G11B 5/4833* (2013.01)

(56) References Cited

U.S. PATENT DOCUMENTS

| | | |
|---|---|---|
| 7,952,839 B2 | 5/2011 | Yamazaki et al. |
| 8,179,642 B2 | 5/2012 | Kawamori et al. |
| 8,218,264 B1 | 7/2012 | Sasaki et al. |
| 8,259,419 B2 | 9/2012 | Fukuzawa et al. |
| 8,274,758 B2 | 9/2012 | Wu et al. |
| 8,503,135 B2 | 8/2013 | Covington et al. |
| 8,582,249 B2 | 11/2013 | Sapozhnikov et al. |
| 8,675,318 B1 | 3/2014 | Ho et al. |
| 8,810,764 B2 | 8/2014 | Nishida et al. |
| 8,828,248 B2 | 9/2014 | Mao et al. |
| 8,836,059 B2 | 9/2014 | Ahn et al. |
| 9,041,391 B2 | 5/2015 | Gao et al. |
| 9,111,550 B1 | 8/2015 | Liu et al. |
| 9,123,886 B2 | 9/2015 | Zhang et al. |
| 9,147,404 B1 | 9/2015 | Luo et al. |
| 9,190,078 B2 | 11/2015 | Sapozhnikov et al. |
| 9,230,577 B2 | 1/2016 | Zhang et al. |
| 9,269,382 B1 | 2/2016 | Bertero et al. |
| 9,286,921 B1 | 3/2016 | Sapozhnikov et al. |
| 9,299,367 B1 | 3/2016 | Tang et al. |
| 9,305,578 B1 | 4/2016 | Singleton et al. |
| 9,384,763 B1 | 7/2016 | Liu et al. |
| 9,401,162 B1 | 7/2016 | Gao et al. |
| 9,406,321 B2 | 8/2016 | Kief et al. |
| 9,437,225 B2 | 9/2016 | Quan et al. |
| 9,449,621 B1 | 9/2016 | Mauri et al. |
| 9,472,216 B1 | 10/2016 | Mauri et al. |
| 9,502,053 B1 | 11/2016 | Sasaki et al. |
| 9,502,061 B1 | 11/2016 | Zhu et al. |
| 9,508,364 B1 | 11/2016 | Tang et al. |
| 9,536,549 B1 | 1/2017 | Ge et al. |
| 9,754,612 B2 | 9/2017 | Wei et al. |
| 9,799,357 B1 | 10/2017 | Ding et al. |
| 9,830,935 B1 | 11/2017 | Gao et al. |
| 9,870,790 B1 | 1/2018 | Hassan et al. |
| 10,068,601 B1 | 9/2018 | Li et al. |
| 10,349,870 B1 | 7/2019 | Demas et al. |
| 10,714,131 B1 | 7/2020 | Wu |
| 11,380,355 B2 | 7/2022 | Garfunkel et al. |
| 2007/0081277 A1 | 4/2007 | Folks et al. |
| 2008/0112080 A1 | 5/2008 | Lengsfield et al. |
| 2009/0279213 A1 | 11/2009 | Wu et al. |
| 2011/0051291 A1 | 3/2011 | Miyauchi et al. |
| 2011/0063755 A1 | 3/2011 | Bai et al. |
| 2011/0069417 A1 | 3/2011 | Kawamori et al. |
| 2011/0090595 A1 | 4/2011 | Hirata et al. |
| 2011/0279923 A1 | 11/2011 | Miyauchi et al. |
| 2012/0063035 A1 | 3/2012 | Childress et al. |
| 2013/0027032 A1 | 1/2013 | Gao et al. |
| 2014/0002930 A1* | 1/2014 | Dimitrov et al. .... G11B 5/3912 360/235.4 |
| 2014/0293475 A1 | 10/2014 | Degawa et al. |
| 2015/0199990 A1 | 7/2015 | Braganca et al. |
| 2015/0221325 A1 | 8/2015 | Ho et al. |
| 2015/0221328 A1 | 8/2015 | Le et al. |
| 2016/0055866 A1 | 2/2016 | Le et al. |
| 2016/0163338 A1 | 6/2016 | Ho et al. |
| 2016/0307586 A1 | 10/2016 | Liu et al. |
| 2017/0249959 A1 | 8/2017 | Bertero et al. |
| 2022/0335969 A1 | 10/2022 | Garfunkel et al. |

OTHER PUBLICATIONS

US Notice of Allowance, U.S. Appl. No. 14/445,167, First Named Inventor: Junjie Quan, Mail date: May 4, 2016, 8 pages.

US Notice of Allowance, U.S. Appl. No. 14/947,577, First Named Inventor: Yaguang Wei, Mail date: May 8, 2017, 9 pages.

US Notice of Allowance, U.S. Appl. No. 16/275,375, First Named Inventor: Yan Wu, Mail date: Apr. 6, 2020, 11 pages.

US Office Action, U.S. Appl. No. 14/947,577, Applicant: Wei et al., Mail date: Jan. 3, 2017, 16 pages.

US Office Action, U.S. Appl. No. 16/275,375, Applicant: Yan Wu., Mail date: Dec. 30, 2019, 18 pages.

US Notice of Allowance, U.S. Appl. No. 17/081,235, Applicant: Garfunkel et al., Mail date: Apr. 11, 2020, 9 pages.

US Office Action, U.S. Appl. No. 17/081,235, Applicant: Garfunkel et al., Mail date: Aug. 18, 2021, 22 pages.

US Notice of Allowance, U.S. Appl. No. 17/856,585, Applicant: Garfunkel et al., Mail date: Sep. 20, 2023, 7 pages.

US Office Action, U.S. Appl. No. 17/856,585, Applicant: Garfunkel et al., Mail date: Jul. 18, 2023, 7 pages.

US Office Action, U.S. Appl. No. 17/856,585, Applicant: Garfunkel et al., Mail date: Mar. 13, 2023, 11 pages.

\* cited by examiner

ADAPTIVE BIAS CONTROL FOR MAGNETIC RECORDING HEAD

This is a divisional application of U.S. patent application Ser. No. 17/856,585; filed on Jul. 1, 1922, which is a divisional application of U.S. patent application Ser. No. 17/081,235; filed on Oct. 27, 2020 and issued as U.S. Pat. No. 11,380,355, which are herein incorporated by reference in their entirety, and assigned to a common assignee.

RELATED PATENT APPLICATIONS

This application is related to the following: U.S. Pat. Nos. 9,437,225; 9,754,612; and 10,714,131; assigned to a common assignee and herein incorporated by reference in their entirety.

TECHNICAL FIELD

The present disclosure relates to a read head (reader) design for improving free layer bias point control where a patterned permanent magnet (PM) is positioned behind the free layer, and between or behind the longitudinal biasing layers, or adjoins the backside of the top shield, and wherein the initialization direction of the PM is selected to decrease asymmetry (Asym) of high Asym heads or increase Asym of low Asym heads at the slider or Head Gimbal Assembly (HGA) level.

BACKGROUND

A magnetic recording device includes a read head comprised of a magneto-resistive (MR) sensor. The MR sensor stack typically has two ferromagnetic (FM) layers that are separated by a non-magnetic layer that is a tunnel barrier in a tunneling MR (TMR) sensor. One of the FM layers is a reference or pinned layer wherein the magnetization direction is fixed by exchange coupling with an adjacent antiferromagnetic (AFM) pinning layer. The second FM layer is a free layer with a magnetization that rotates in response to external magnetic fields, and is aligned in a direction that is proximate to 90 degrees with respect to the pinned layer magnetization direction in the absence of an external field (zero field). When a local field is applied to the FL, the FL magnetization will rotate into or out of the ABS, which results in the sensor resistance higher or lower than under zero field and thereby determines the "up" or "down" states (i.e. P and AP states).

In longitudinal (L) biasing read head designs, hard bias films with high coercivity, or more commonly, a junction shield that has a soft biasing layer coupled to the top or bottom shield (also known as an L biasing layer), are adjacent to the edges of the MR sensor in the cross-track direction and particularly proximate to the sides of the free layer. Top and bottom magnetic shields with in-plane magnetization are often used to stabilize the magnetization direction in the L biasing layers. As the critical dimensions for MR sensor elements become smaller with higher recording density requirements, the free layer becomes more volatile and more difficult to bias. Moreover, a lower resistance x area (RA) value is required for a MgO tunnel barrier in a TMR sensor. Accordingly, there is a stronger coupling between the FL and pinned layer, and a shift in the resulting Asym towards a more positive value.

MR sensors often generate an asymmetric response signal which is usually defined by the difference between the amplitude of the positive and negative peaks in the asymmetric response signal normalized by their average value, and expressed in equation (1):

$$\text{asymmetry(Asym)} = (|\text{peak } P| - |\text{peak } N|)/(|\text{peak } P| + |\text{peak } N|)/2$$

where peak P and peak N are the amplitude of positive and negative pulses in the asymmetric response signal. Asym may range from −100% to +100%. However, Asym is typically controlled from −20% to +20%, and preferably is proximate to 0%.

Readers for magnetic recording heads often suffer from poor control of Asym because of several factors including junction defects, unexpected magnetic domains in critical layers, and loss of coupling in antiferromagnetic coupling (AFC) and AFM layers. This results in significant head to head and wafer to wafer variation in read back signal, and negatively impacts yield and performance. Accordingly, a new read head structure is needed with better Asym control and that is compatible with bias point control at a slider or HGA level.

SUMMARY

One objective of the present disclosure is to provide a read head structure that enables improved bias point control and provides for an adjustment in Asym.

A second objective of the present disclosure is to provide a process for improving bias point control and Asym according to the first objective, and that is performed at a slider or HGA level.

According to one preferred embodiment of the present disclosure, a read head is formed between a bottom shield and a top shield, and comprises a TMR sensor with a free layer, L biasing layer adjacent to each side of the free layer in the cross-track direction, and a permanent magnet (PM) layer behind the free layer (FL) and within 100 nm of the FL backside. Although the L biasing layers are usually not field settable, the PM layer has lower coercivity than the L biasing layers and may be initialized in various magnetization directions. Asym is measured and then PM magnetization is set by way of an initialization process that improves Asym and enables better control of the free layer bias point.

In one embodiment, the free layer and L biasing layers each have a front side at the ABS, a backside at a first height (h1) from the ABS, and have a magnetization substantially in a first cross-track direction. The L biasing layers have an outer side at a cross-track distance ½ w1 from a center plane that is orthogonal to the ABS and bisects the MR sensor. The PM layer may have a rectangular shape from a top-down view with outer sides at distance ½ w1 from the center plane, and a front side that is separated by a distance k from the FL backside where k is greater than 0 nm but less than 100 nm so that the free layer is within the PM layer fringe field. PM layer magnetization may be initialized to be oriented at an angle that is from −90 degrees to +90 degrees with respect to the first cross-track direction. An insulation layer separates the FL from the L biasing layers and from the PM layer.

In an alternative embodiment, the free layer backside is maintained at height h1 but each L biasing layer is extended a greater distance from the ABS and has a backside at height h where h>h1. In this case, each of the free layer and PM layer has a width w and is bisected by the center plane. Thus, each outer side of the PM layer is parallel to an inner side of the adjacent L biasing layer and is separated therefrom by an insulation layer. The PM layer front side is a distance k behind the FL backside. The PM layer is initialized in a direction that is orthogonal to the ABS and is either pointing toward or away from the FL backside. In each of the first two embodiments, the zone of magnetic interaction for bias point adjustment is between a back portion of the free layer and a front portion of the PM layer, and there is essentially no interaction between the PM layer and top shield.

According to a third embodiment, a front side of the PM layer adjoins a backside of the top shield so that the PM layer also couples to the top shield in addition to the free layer. Again, PM layer magnetization may be initialized to be oriented at an angle that is from −90 degrees to +90 degrees with respect to the first cross-track direction.

In each embodiment, PM layer initialization may be performed at slider or HGA level, for individual head adjustments, or at row, block, or wafer level. For individual head adaptive bias tuning, PM initialization direction is selected depending on a prior measurement of head asymmetry.

The present disclosure also includes a process involving a sequence of steps to form the PM layer, L biasing layers, and TMR sensor.

DETAILED DESCRIPTION

Figure 1:
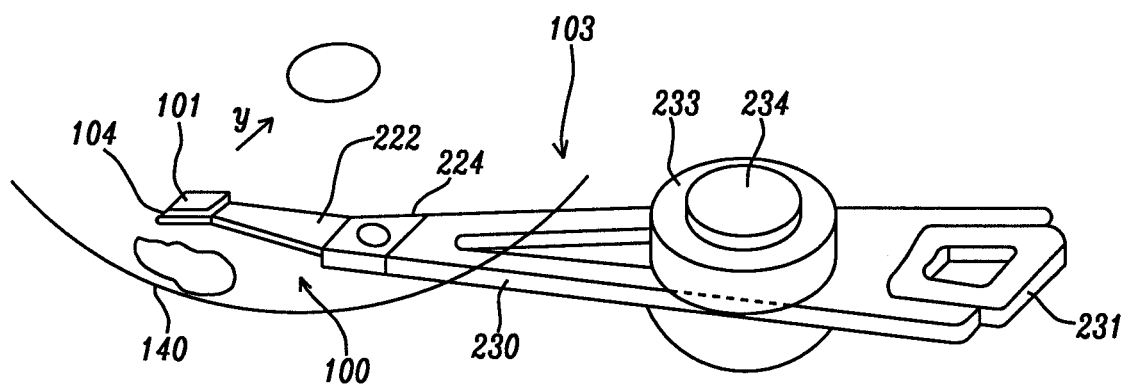
FIG. 1 is a perspective view of a head arm assembly of the present disclosure.

The present disclosure is a reader design that provides improved Asym control and enables an adjustment in FL bias point for improved device yield. Although the exemplary embodiments relate to a single reader in a combined read-write head, for example, the reader design described herein may be incorporated in a multiple reader structure such as a dual reader (2DMR) or triple reader (3DMR) scheme as described in related U.S. Pat. No. 10,714,131. In the drawings, the y-axis is a cross-track direction, the z-axis is a down-track direction, and the x-axis is in a direction orthogonal to the ABS and towards a back end of the read head. The term "front side" refers to a side of a layer that faces the ABS or is at the ABS while "backside" is a side of the layer facing away from the ABS. The terms "read head" and "reader" are used interchangeably. The TMR sensor is the stack comprising the FL, tunnel barrier, and pinned layer formed between the top and bottom shields. The term "magnetization" is also known in the art as "magnetic moment".

Referring to FIG. 1, a HGA 100 includes a magnetic recording head 101 comprised of a slider and a combined read-write structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
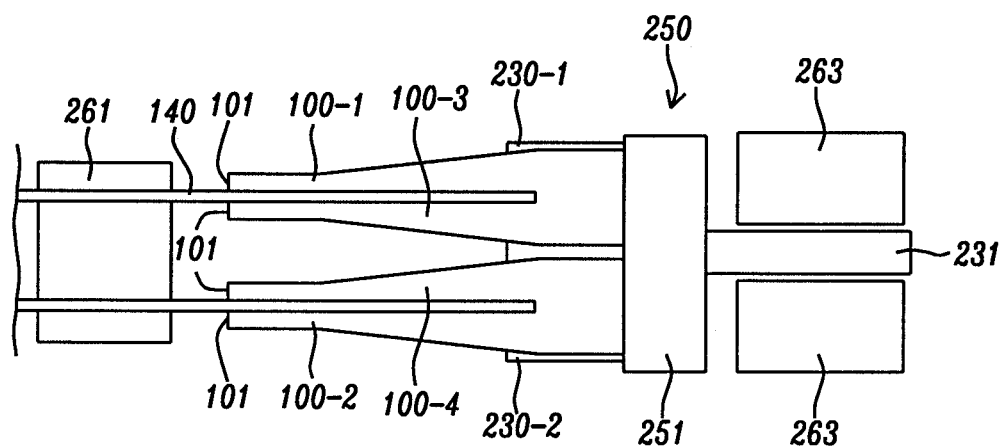
FIG. 2 is side view of a head stack assembly of the present disclosure.

Next, a side view of a head stack assembly (FIG. 2) and a plan view of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
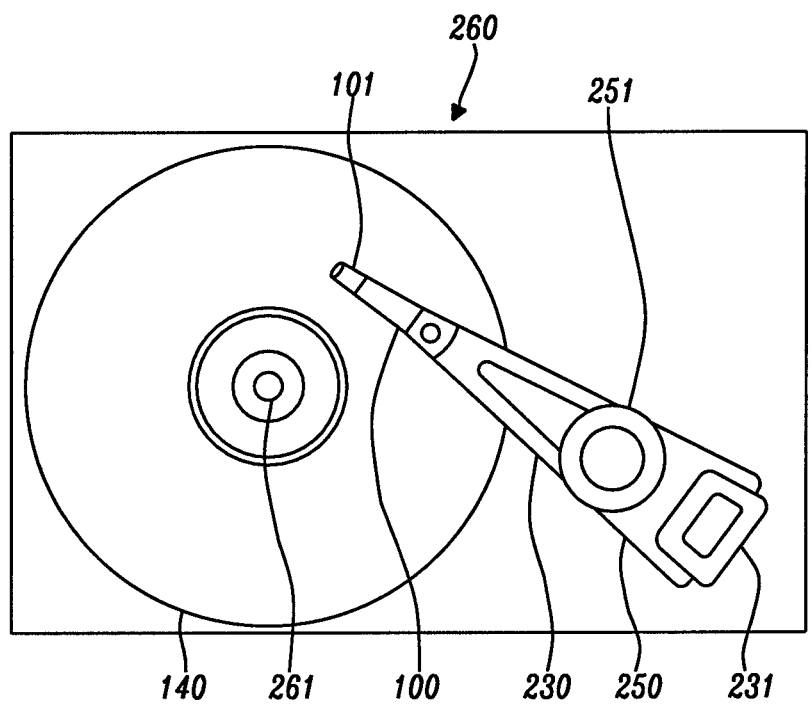
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a perpendicular magnetic recording (PMR) writer element (not shown) and reproduces the information recorded in the magnetic recording media by a magnetoresistive (MR) sensor element (not shown).

Figure 4:
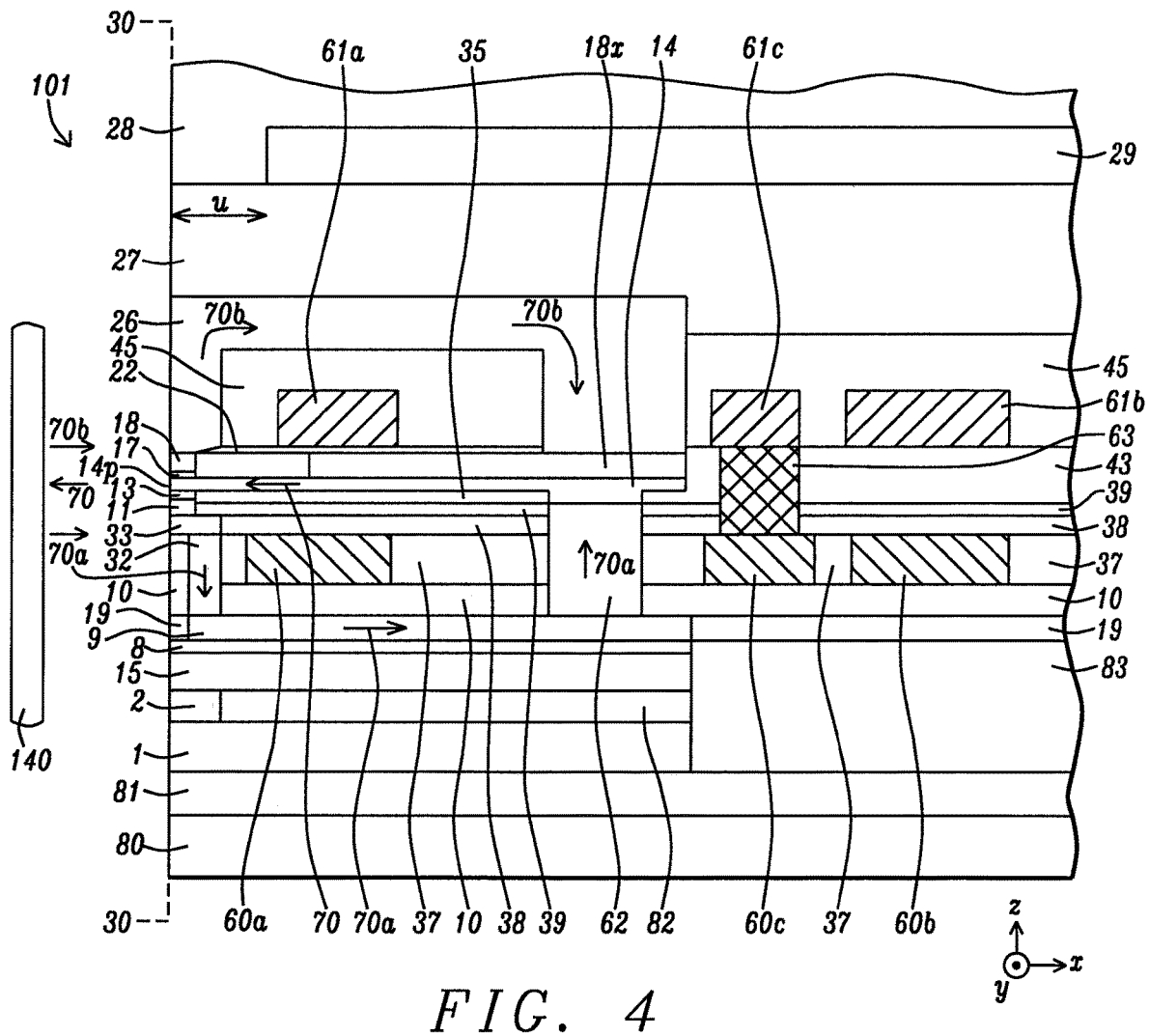
FIG. 4 is a down-track cross-sectional view of a combined read-write head wherein a sensor is formed between top and bottom shields in the read head portion according to an embodiment of the present disclosure.

Referring to FIG. 4, magnetic recording head 101 comprises a combined read-write head similar to the one described in related U.S. Pat. No. 9,754,612. The down-track cross-sectional view is taken along a plane (44-44 in FIG. 5) formed orthogonal to the ABS 30-30, and that bisects the main pole layer 14. The read head is formed on a substrate 80 that may be comprised of AlTiC (alumina+TiC) with an overlying dielectric layer 81 that is made of a dielectric layer such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 1 is formed on dielectric layer 81.

A magnetoresistive (MR) element also known as TMR sensor 2 is formed at the ABS 30-30, in dielectric layer 82, and on bottom shield 1 and typically includes a plurality of layers that are described later with regard to FIG. 5. Dielectric layer 83 adjoins the backsides of the top and bottom shield, and TMR sensor. A top magnetic shield 15 is formed on the TMR sensor. An insulation layer 8 and a top shield (S2B) layer 9 are sequentially formed on the top shield. Note that the S2B layer 9 may serve as a flux return path (RTP) in the write head portion of the combined read/write head. Thus, the portion of the combined read/write head structure formed below layer 9 in FIG. 4 is typically considered to as the read head.

The present disclosure anticipates that various configurations of a write head (PMR writer) may be employed with the read head portion. In the exemplary embodiment, magnetic flux 70 in main pole layer 14 is generated with flowing a current through a bucking coil with front portion 60a, center portion 60c, and back portion 60b, and through a driving coil with front portion 61a, center portion 61c, and back portion 61b that are below and above the main pole layer, respectively, and are connected by interconnect 63 in a well known 1+1T coil design. Back portions 60b, 61b are each connected to a writer pad (not shown) in the write current circuit. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, PP3 shield 26, and top yoke 18x.

There is also a leading return loop for magnetic flux 70a that includes leading shield 11, leading shield connector (LSC) 33, S2 connector (S2C) 32, return path 9, and back gap connection (BGC) 62. The magnetic core may also comprise a bottom yoke 35 below the main pole layer. Dielectric layers 10, 13, 19, 22, 37-39, 43, and 45 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
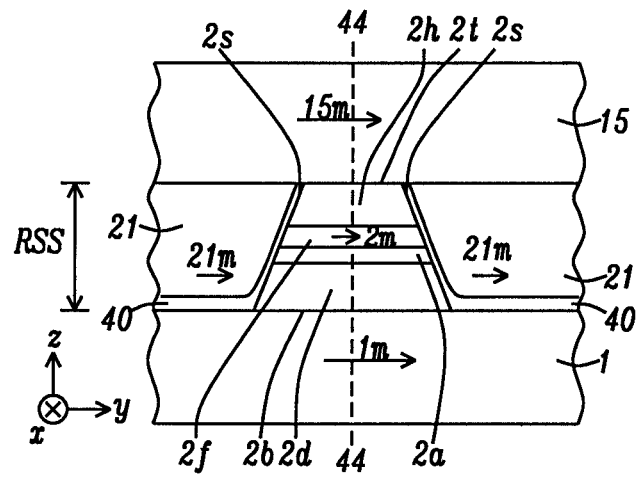
FIG. 5 is an ABS view of the sensor in FIG. 4 showing that a free layer (FL) magnetization is aligned in the same cross-track direction as two longitudinal biasing layers adjacent to each side of the FL according to an embodiment of the present disclosure.

Referring to FIG. 5, an ABS view is shown of a portion of the read head including bottom shield 1, top shield 15, L biasing layers 21, and the TMR sensor having a lower layer 2d, tunnel barrier layer 2a, middle free layer 2f, and upper layer 2h that is formed on a center section of the bottom shield. Sidewalls 2s connect a bottom surface 2b with the top surface 2t of the TMR sensor, and are formed equidistant from center plane 44-44 that bisects the TMR sensor. There is a non-magnetic isolation layer 40 formed along the sidewalls 2s and on portions of the bottom shield that are not covered by the TMR sensor. The L biasing layers are primarily responsible for providing longitudinal biasing to the free layer that has magnetization 2m substantially in the same direction as L biasing magnetization 21m. Magnetization 1m in the bottom shield, and magnetization 15m in the top shield stabilize the magnetization direction in the L biasing layers, and are in a cross-track direction parallel to magnetization 21m. Top and bottom shields are comprised of CoFe, CoFeNi, CoFeN, or NiFe, for example, while the L biasing layers are typically made of one or more of NiFe, CoFe, and CoFeNi.

Upper layer 2h in the TMR sensor comprises at least a capping layer, and lower layer 2d includes a reference (pinned) layer with a fixed magnetization direction. Layer 2d may also include a bottommost seed layer, and an antiferromagnetic (AFM) layer such as IrMn or another Mn alloy may be formed on a side of the reference layer that faces away from the free layer to pin the magnetization direction in the reference layer. In other embodiments, the AFM layer (not shown) may be recessed behind the TMR sensor stack, or formed behind a back portion of the bottom shield 1 to satisfy reduced reader shield spacing (RSS) requirements as described in related U.S. Pat. No. 9,437, 225. The tunnel barrier layer is typically comprised of one or more metal oxides, metal oxynitrides, or metal nitrides. In some embodiments, the reference layer has a synthetic antiferromagnetic (SyAF) configuration, also known as an AFC configuration, with an uppermost AP1 magnetic layer, a middle antiferromagnetic coupling layer, and a lower AP2 magnetic layer.

Figure 6A:
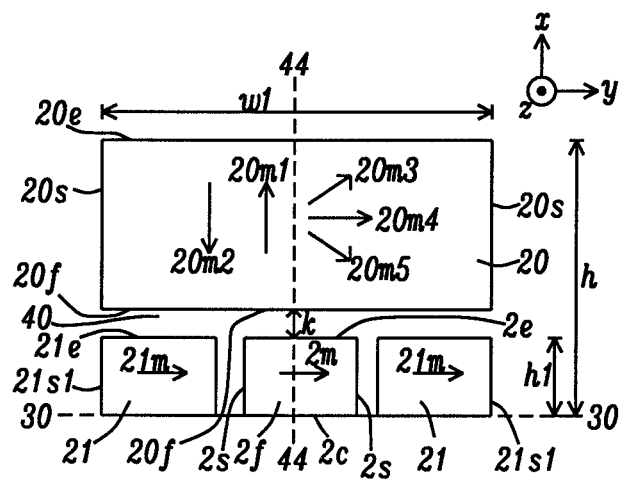
FIG. 6A is an top-down view of a reader structure with the top shield removed and where a PM layer is formed behind the L biasing layers and FL, and has a magnetization initialized in a direction between −90° to +90° with regard to a cross-track direction according to an embodiment of the present disclosure.

According to a first embodiment of the present disclosure depicted in FIG. 6A where layers above free layer (FL) 2f and L biasing layers 21 are removed, Asym in the read back signal is controlled and FL bias point is improved by incorporating a permanent magnet (PM) layer 20 that is positioned a distance k greater than 0 nm but less that 100 nm behind FL backside 2e so that the free layer is within the PM layer fringe field. Thus, the primary magnetic interaction between the FL and PM layer is between the FL backside and PM layer front side 20f. The FL front side 2c is at the ABS 30-30, and FL sides 2s are separated from the adjacent L biasing layers by insulation layer 40. Preferably, PM layer with sides 20s has a width w1 equal to the distance between outer sides 21s1 of the L biasing layers. In the exemplary embodiment, the L biasing layers and the free layer extend from a front side at the ABS to a backside 21e and backside 2e, respectively, that are at height h1 from the ABS. Note that insulation layer 40 also separates the L biasing layer and FL backsides from PM layer front side 20f. The PM layer is made of Co Pt, CoCrPt, or another permanent magnetic material used in the art. PM layer backside 20e is at height h from 50 nm to a plurality of hundreds of nm from the ABS where h is substantially larger than h1. Preferably, the PM layer has coercivity in a range of 500 Oe to 1000 Oe while the L biasing layer coercivity is typically from 1000 Oe to 3000 Oe. In embodiments where soft magnetic materials in the L biasing layers are coupled to the top and/or bottom shield, the PM layer coercivity is not necessarily lower than that of the L biasing layers.

Figure 6B:
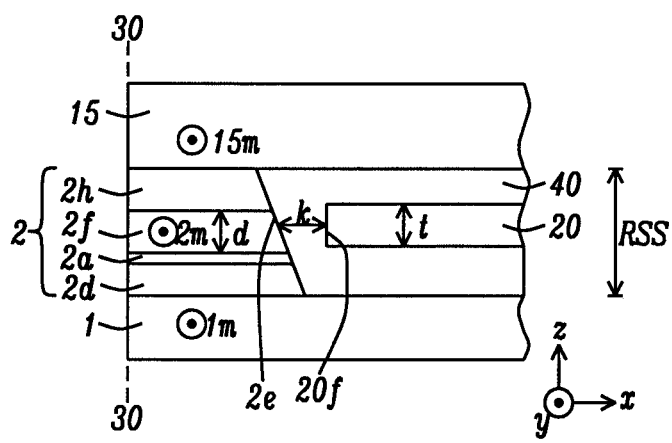
FIG. 6B is a down-track cross-sectional view of the reader in FIG. 6A.

FIG. 6B shows a down-track cross-sectional view of the first embodiment at plane 44-44 in FIG. 6A. PM layer 20 has a thickness t that may be greater than thickness d of FL 2f. In the exemplary embodiment, FL backside 2e is not vertical and a top end that contacts upper layer 2h is closer to the ABS 30-30 than a bottom end that contacts tunnel barrier layer 2a. According to the first embodiment, the PM layer is magnetically coupled predominantly with the FL although there may be a certain degree of PM layer magnetic interaction with the top shield 15 and bottom shield 1 depending on reader shield-to-shield spacing (RSS) and the magnitude of t.

Returning to FIG. 6A, an important feature of the present disclosure is that PM layer 20 is initialized to have a magnetization direction that controls TMR sensor Asym within a certain range, and that adjusts the FL bias point as described in more detail later. In particular, TMR sensor Asym is reduced in absolute value to be closer to 0% than before the initialization. For example, the PM layer may be initialized (after TMR sensor formation is complete) to a direction that is orthogonal to the ABS 30-30 and either pointing away from the ABS (20m1) or toward the ABS (20m2). In other embodiments, the PM layer magnetization is oriented after initialization at an angle that is less than +90 degrees (20m3 or 20m5) but greater than −90 degrees with respect to the y-axis (cross-track direction) including a 0 degree angle (20m4), which is in the cross-track direction and parallel to L biasing magnetization 21m. Since the L biasing layers 21 have coercivity greater than in the PM layer 20, or may be ≤ to that of the PM layer in embodiments where L-biasing layers are coupled to one or both of the top shield 15 and bottom shield 1, PM layer initialization has no effect on L biasing magnetization.

In one embodiment, PM layer is initialized in a first direction to decrease Asym of high Asym heads, and the opposite direction is selected to reduce the absolute value of Asym in low Asym heads. High asymmetry is defined as proximate to 10% or higher, while low asymmetry is defined as proximate to −5% or a more negative value than −5%. Thus, the initialization is beneficial in lowering the high Asym value closer to 0%, or shifting the low Asym absolute value closer to 0%. The initialization step may be performed at a slider or HGA level, for individual head adjustments, or at a row, block, or wafer level to adjust a plurality of heads simultaneously. For individual head adaptive bias tuning, the initialization direction is selected based on a prior measurement of head Asym that is measured using quasi-static probing of the sensor under an external magnetic field as appreciated by those skilled in the art.

Figure 7:
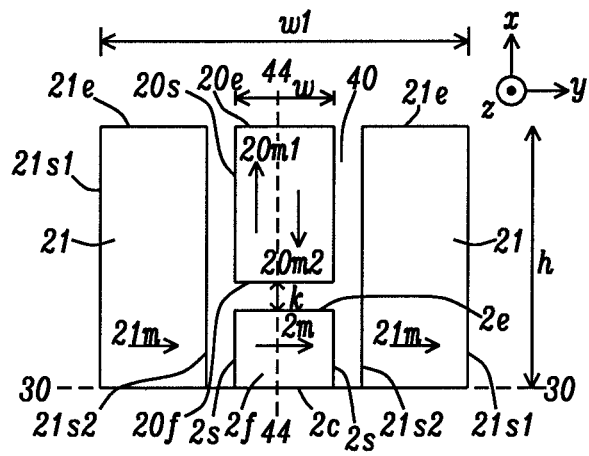
FIG. 7 is a top-down view of a reader wherein the L biasing layers in FIG. 6A are extended to a greater height from the ABS, and the PM layer has a width equal to that of the FL, and is formed between inner sides of the L biasing layers and behind the FL according to a second embodiment of the present disclosure.

Referring to FIG. 7, a second embodiment of the present disclosure is shown from a top-down view where the first embodiment is modified to extend each L biasing layer backside 21e to height h, which is equivalent to the height of the PM layer backside 20e from the ABS 30-30. Furthermore, PM layer width is reduced to w and is substantially equivalent to the FL width so that PM layer sides 20s are facing inner L biasing layer sides 21s2, and are separated therefrom by insulation layer 40. Outer L biasing layer sides 21s1 are maintained at a cross-track distance ½ w1 from center plane 44-44. Again, FL backside 2e is a distance k from PM layer front side 20f. In this case, the PM layer is preferably initialized to the 20m1 or 20m2 magnetization directions described previously. FIG. 6B is also representative of the down-track cross-sectional view at plane 44-44 in FIG. 7.

Figure 8:
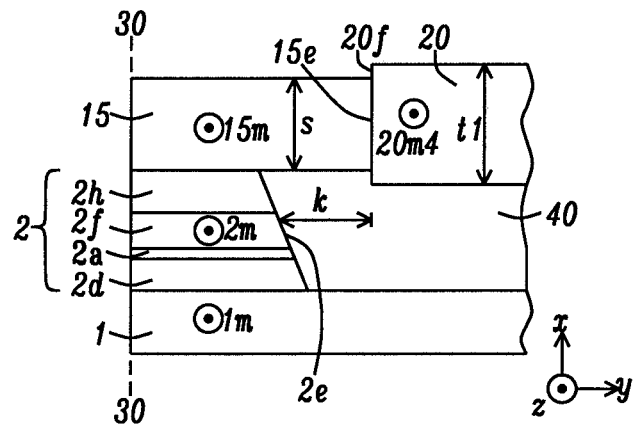
FIG. 8 is a down-track cross-sectional view of a reader structure wherein the front side of the PM layer adjoins the backside of the top shield, and is a greater height from the ABS than the free layer backside according to a third embodiment of the present disclosure.

According to a third embodiment of the present disclosure depicted by the down-track cross-sectional view in FIG. 8, the second embodiment is modified to move PM layer 20 behind top shield 15 such that PM layer front side 20f adjoins top shield backside 15e. In the exemplary embodiment, the PM layer thickness is increased to t1 where t1 is greater than top shield thickness s. However, in other embodiments t1 may be ≤s. As a result, the PM layer is magnetically coupled to the top shield, and has a smaller interaction with FL 2f than in the previous two embodiments. In this case, the PM layer is preferably initialized in one of the directions 20m1-20m5. Instead of having a direct dipolar field to the FL to impact sensor Asym, it has a direct dipolar field to the top shield so that the top shield is rotated slightly, which directly impacts the rotation of FL magnetization to change sensor Asym. The PM layer width may be w1 as indicated in FIG. 6A, or may be reduced to the FL width. However, PM layer initialization will have a greater effect on adjusting sensor Asym in embodiments where PM layer width is substantially greater than that of FL 2f.

Figure 9:
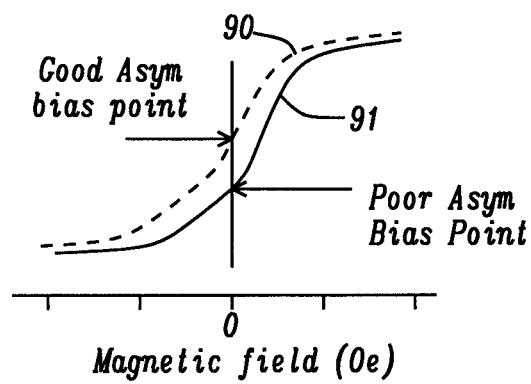
FIG. 9 is a schematic drawing showing two possible PM initialization directions and how the PM initialization direction results in poor or good bias point adjustment.

FIG. 9 is a schematic drawing that illustrates poor and good bias point adjustment imparted by down initialization (20m2 direction in FIG. 6A) and up initialization (20m1 direction in FIG. 6A) to generate curves 91 and 90, respectively. A good adjustment means at zero field, the magnetic state of the TMR sensor is close to half way between the P state and AP state, so that the Asym is closer to zero percent than before the adjustment.

Figure 10:
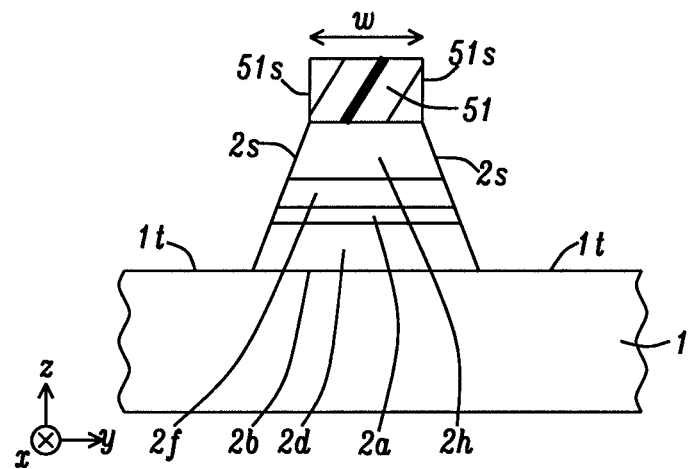
FIGS. 10-11 are ABS views showing a sequence of steps used to form a cross-track width in a TMR sensor, and then depositing an insulation layer and L biasing layer on each sidewall according to an embodiment of the present disclosure.

The present disclosure also encompasses a method of fabricating a reader having a PM layer formed behind the TMR sensor according to one of the previously described embodiments. Referring to FIG. 10, a first step in a key sequence of forming a reader with a TMR sensor according to the first embodiment is depicted. After a TMR sensor stack of layers 2d, 2a, 2f, 2h is deposited on a bottom shield, a first photoresist mask 51 is formed on the sensor stack using a conventional technique and has sidewalls 51s separated by the desired sensor cross-track width w. Portions of the TMR sensor stack not protected by the photoresist mask are removed with an etching process such as a ion beam etch (IBE) to generate sidewall 2s on each side of the TMR sensor, and stopping on bottom shield to surface it. Note that the etch process typically produces tapered sidewalls where the width of upper layer 2h is less than the width of lower layer 2d.

Figure 11:
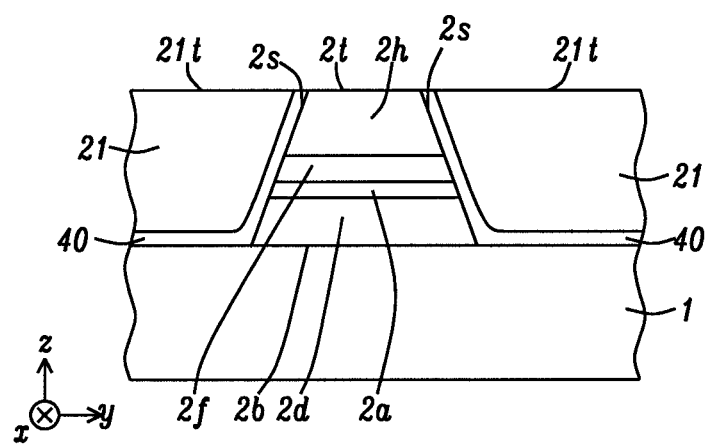

FIG. 11 shows the partially formed reader after insulation layer 40 and L biasing layer 21 are sequentially deposited on sidewalls 2s. A planarization step such as a chemical mechanical polish (CMP) process may be performed to generate MR sensor top surface 2t that is coplanar with L biasing layer top surface 21t.

Figure 12:
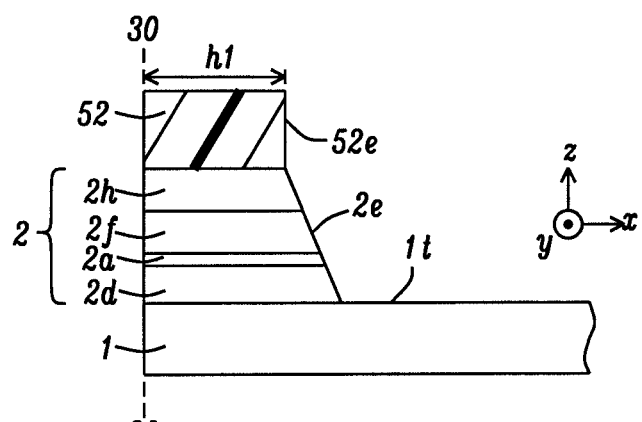
FIGS. 12-13 are down-track cross-sectional views of the TMR sensor in FIG. 11 after a stripe height is formed on a backside of the sensor, and then an insulation layer and PM layer are deposited in the opening behind the sensor backside.

Referring to FIG. 12, second photoresist mask 52 with backside 52e is formed on the TMR sensor top surface. The second photoresist mask backside is a stripe height h1 from the eventual ABS plane 30-30 and is used to determine the TMR sensor backside 2e after a subsequent IBE step, for example, that stops on bottom shield top surface it.

Figure 13:
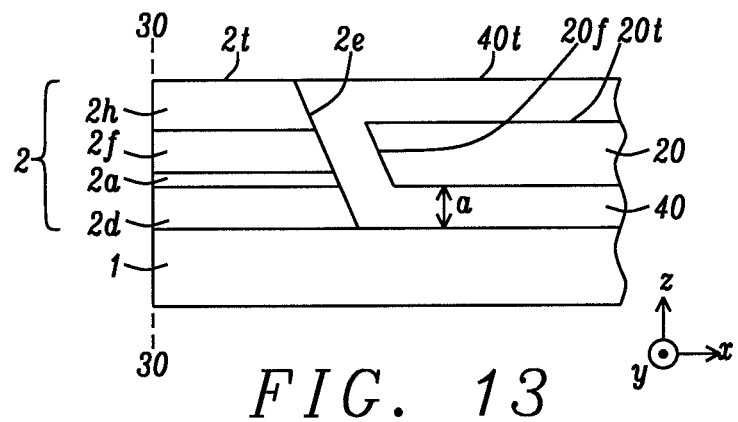

In FIG. 13, insulation layer 40 having thickness a, and the PM layer 20 are sequentially deposited on the TMR sensor backside 2e and on bottom shield top surface it. Finally, a top portion of insulation layer 40 is deposited on PM layer top surface 20t. Another CMP process may be performed so that the TMR sensor top surface 2t is coplanar with insulation layer top surface 40t. In the exemplary embodiment, insulation layer 40 that is deposited on the TMR sensor sidewalls 2s and on the TMR sensor backside is the same material. However, in other embodiments, the material in the insulation layer deposited on TMR sensor sidewalls may be different from the material in the insulation layer deposited on the TMR sensor backside.

Thereafter, a conventional sequence of steps is employed to fabricate the top shield and overlying write head illustrated in FIG. 4. A lapping process is used to establish ABS 30-30 after all layers in the combined read-write head are formed.

It should be understood that the same process steps depicted in FIGS. 10-13 may also be employed to fabricate the reader and TMR sensor structure shown in the second embodiment in FIG. 7. However, the sequence of steps is changed so that the TMR sensor backside 2e is formed first as in FIG. 12, followed by deposition of insulation layer 40 and PM layer 20 according to FIG. 13. Then, the cross-track width of the TMR sensor is determined by following the etch process described earlier with regard to FIG. 10, and finally, deposition of insulation layer 40 and L biasing layers 21 on the TMR sensor sidewalls 2s as in FIG. 11.

Figure 14:
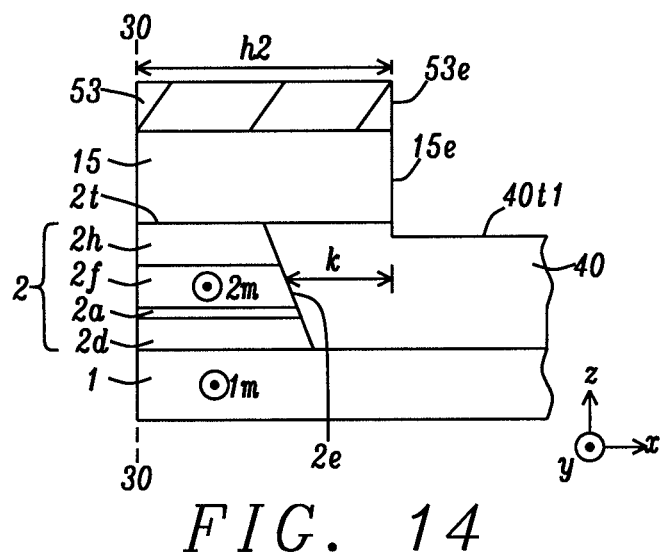
FIGS. 14-15 are down-track cross-sectional views showing a sequence of steps to form a PM layer behind a top shield in a TMR sensor according to the third embodiment of the present disclosure.
Figure 15:
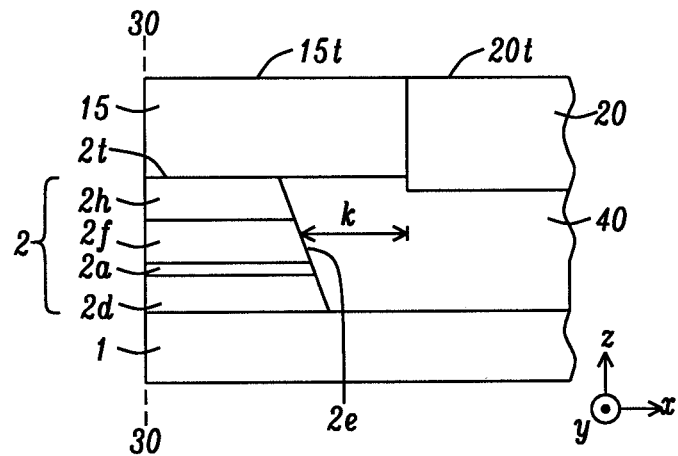

The key steps in the process sequence for building the reader with TMR sensor structure in the third embodiment (FIG. 8) are depicted in FIGS. 14-15. A conventional reader having a TMR sensor 2 is formed between bottom shield 1 and top shield 15. According to FIG. 14, a photoresist mask 53 with backside 53e is formed on TMR sensor top surface 2t. The photoresist mask backside is at height h2 that is a distance k from TMR sensor backside 2e. An etch process removes portions of the top shield not protected by the photoresist mask, and stops on insulation top surface 40t1 that may be a lesser down-track distance from the bottom shield than the TMR sensor top surface. As a result, top shield backside 15e is formed.

Referring to FIG. 15, the PM layer 20 is deposited on insulation layer top surface 40t1 and adjoins top shield backside 15e. Another CMP process may be utilized to provide PM layer top surface 20t that is coplanar with top shield top surface 15t. In other embodiments, the PM layer top surface is not planarized and is a greater distance from the bottom shield than the top shield top surface as indicated in FIG. 8.

While this disclosure has been particularly shown and described with reference to, the preferred embodiments thereof, it will be understood by those skilled in the art that various changes in form and details may be made without departing from the spirit and scope of this disclosure.

We claim:

1. A magnetic read head structure, comprising:
 (a) a tunneling magnetoresistive (TMR) sensor formed on a bottom shield and with a front side at an air bearing surface (ABS), and wherein the TMR sensor comprises a free layer (FL) with a first magnetization substantially in a first cross-track direction, and has two sidewalls formed equidistant from a center plane that bisects the TMR sensor;
 (b) the bottom shield;
 (c) a longitudinal (L) biasing layer that is adjacent to each of the two FL sidewalls, and each L biasing layer has a front side at the ABS, a second magnetization in the first cross-track direction, and provides a bias field to stabilize the first magnetization in the FL;
 (d) a top shield that contacts a top surface of the TMR sensor; and
 (e) a permanent magnet (PM) layer with a front side that adjoins a backside of the top shield, and wherein the PM layer has a magnetization direction that adjusts a FL bias point so that the absolute value of TMR sensor asymmetry is reduced and is closer to 0% than in the absence of the PM layer.

2. The magnetic read head structure of claim 1 wherein the PM layer has a thickness greater than a thickness of the top shield.

3. The magnetic read head structure of claim 1 wherein the PM layer is comprised of CoPt, CoCrPt, or FePt and has a coercivity from about 500 Oersted (Oe) to 1000 Oe.

4. The magnetic read head structure of claim 1 wherein the FL has a backside at a first height (h1), and the PM layer front side is a distance that is greater than h1 but less than a sum (h1+100 nm) from the ABS.

5. The magnetic read head structure of claim 1 wherein the PM layer magnetization direction forms an angle that is from +90 degrees to −90 degrees with respect to the first cross-track direction.

6. The magnetic read head structure of claim 1 wherein the PM layer has a cross-track width equal to or greater than that of the FL.

7. A head gimbal assembly (HGA), comprising:
 (a) the magnetic read head structure of claim 1; and
 (b) a suspension that elastically supports the magnetic read head structure, wherein the suspension has a flexure to which the magnetic read head structure is joined, a load beam with one end connected to the flexure, and a base plate connected to the other end of the load beam.

8. A magnetic recording apparatus, comprising:
 (a) the HGA of claim 7;
 (b) a magnetic recording medium positioned opposite to a slider on which the read head structure is formed;
 (c) a spindle motor that rotates and drives the magnetic recording medium; and
 (d) a device that supports the slider, and that positions the slider relative to the magnetic recording medium.

* * * * *

UNITED STATES PATENT AND TRADEMARK OFFICE
CERTIFICATE OF CORRECTION

| | | |
|---|---|---|
| PATENT NO. | : 12,211,526 B2 | Page 1 of 1 |
| APPLICATION NO. | : 18/497867 | |
| DATED | : January 28, 2025 | |
| INVENTOR(S) | : Glen Garfunkel et al. | |

It is certified that error appears in the above-identified patent and that said Letters Patent is hereby corrected as shown below:

In the Specification

In Column 1, Line 5, please replace "Jul. 1, 1922" with "Jul. 1, 2022".

Signed and Sealed this
Twenty-second Day of April, 2025

Coke Morgan Stewart
*Acting Director of the United States Patent and Trademark Office*